# United States Patent Office 2,792,682
Patented May 21, 1957

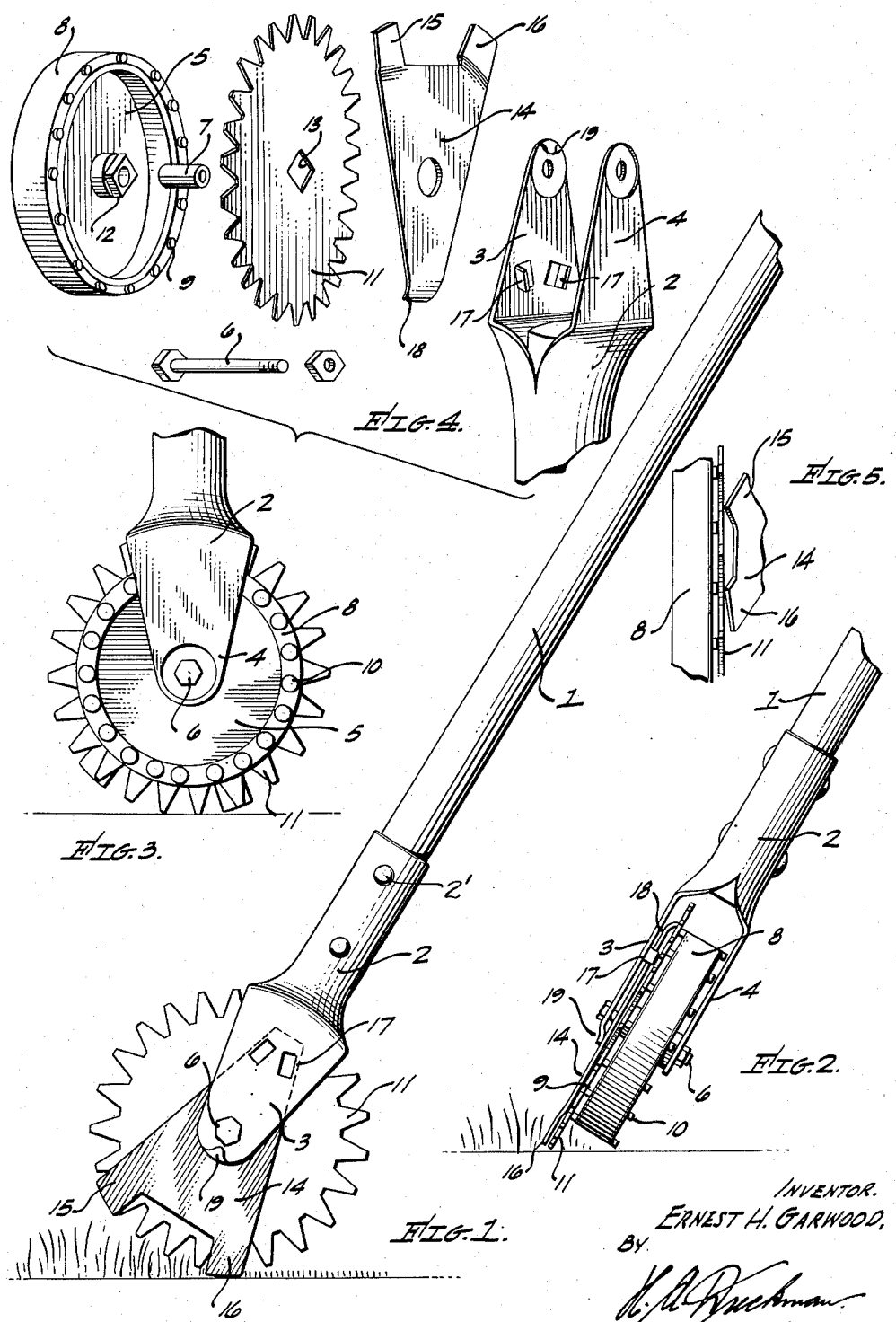

2,792,682
TOOTHED DISC TYPE ROTARY LAWN EDGER
Ernest H. Garwood, Long Beach, Calif.

Application March 25, 1954, Serial No. 418,535

5 Claims. (Cl. 56—256)

This invention relates to a hand operated rotary lawn edger with which grass is cut at the edge of a lawn, and adjacent to walks, paths, and the like.

An object of my invention is to provide a novel lawn edger, including a rotary toothed disc which rotates relative to a fixed blade, the toothed wheel or disc being yieldably pressed against the fixed blade.

Another object of my invention is to provide a novel hand operated rotary lawn edger of the character stated, in which the fixed blade is so constructed and arranged that it will have a spring pressure against the rotary toothed disc.

Still another object of my invention is to provide a novel hand operated rotary lawn edger which is simple in construction and inexpensive to manufacture.

Still another object of my invention is to provide a novel hand operated rotary lawn edger of the character stated, in which the rotary toothed disc and the fixed blade are yieldably pressed, one against the other, in such a manner that the disc and the blade can move relative to each other and still be pressed together with sufficient force to effectively cut the blades of grass which pass between these members.

Other objects, advantages and features of invention may appear from the accompanying drawing, the subjoined detailed description and the appended claims.

In the drawing:

Figure 1 is a side elevation of my rotary lawn edger.

Figure 2 is an end view of the same.

Figure 3 is a fragmentary side elevation of the reverse side from that shown in Figure 1.

Figure 4 is a disassembled view of the parts of my lawn edger.

Figure 5 is a fragmentary bottom plan view of the fixed blade and rotary disc.

Referring more particularly to the drawing, the numeral 1 indicates a handle which is grasped by the operator to operate the edger. A fork 2 is attached to the handle 1 by means of suitable rivets, bolts, or the like 2', in a usual and well known manner. The fork 2 is bifurcated to form the two arms 3 and 4. A ground engaging wheel 5 is mounted between the arms 3 and 4 and rotates on a bolt 6 which extends through these arms. A sleeve bearing 7 surrounds the bolt 6 and the wheel 5 is journaled on the sleeve 7 to provide a more effective journal. A tire 8, preferably formed of rubber or plastic, is fixedly mounted on the periphery of the wheel 5 and this tire is provided with buttons or projections 9 on one side thereof, and similar projections or buttons 10 on the other side thereof. These buttons are circumferentially spaced and act as pressure points or spring-like members, as will be further described. A toothed disc 11 is non-rotatably mounted against one face of the tire 8 and presses against the buttons 9. The wheel 5 is provided with a square hub 12 and the disc 11 has a square hole 13 which fits onto this hub. The disc 11 thus rotates with the wheel 5, but it can move laterally relative to the wheel due to the sliding movement on the square hub 12. A stationary or fixed blade 14 is mounted against one side of the disc 11, and this blade is provided with two spaced cutter members 15—16, which bear against the side of the disc 11 and against the teeth of this disc. The bearing sleeve 7 presses through the blade 14 and thus supports the blade at the center. The blade is held against rotation by two inwardly bent lugs 17—17 on the arm 3, substantially as shown. The end of the blade 14 is also bent inwardly, as shown at 18, this bent portion of the blade pressing against the side of the disc 11. The cutter members 15 and 16 are also bent slightly so that the inner edges thereof will engage the toothed portion of the disc 11 along an edge instead of the flat side of the cutter members.

The buttons 9, being formed of rubber or a yieldable plastic, bear against the toothed disc 11 and yieldably press this disc outwardly against this stationary blade 14, thus yieldably pressing these members together so that the grass which passes between disc 11 and blade 14 will be effectively cut. The buttons 9 being circumferentially spaced will effectively press the disc 11 uniformly outwardly and will keep the disc properly aligned with the blade 14 at all times. The upper end of the blade 14, being bent as shown at 18, will press the upper end of the blade away from the surface of the disc 11, thus tending to press the cutter members 15 and 16 against the teeth of the disc 11. The arm 3 is punched inwardly, as shown at 19, to press against the blade 14 to also urge the cutter members against the disc 11. The buttons 10 on the outer side of the tire 8 are used similar to gear teeth for the purpose of gripping the walk, path, or the like, when the edger is held at an angle as shown in Figure 2. This position being assumed when trimming against a fence or other vertical obstruction. Thus the wheel 5 can be effectively rotated even though the edger is not held in a vertical position.

Having described my invention, I claim:

1. A lawn edger comprising a handle, a fork mounted on the handle, a wheel rotatably mounted in the fork, a toothed disc mounted on the wheel for limited axial movement relative to the wheel, a non-metallic tire on the wheel, outwardly projecting buttons on the tire bearing against one side of said disc, a spring blade, means non-rotatably mounting the blade on said fork and said blade bearing against one side of the disc opposite the tire.

2. A lawn edger comprising a handle, a fork mounted on the handle, a wheel rotatably mounted in the fork, a toothed disc mounted on the wheel, a non-metallic tire on the wheel, outwardly projecting buttons on the side of the tire, said buttons bearing against one side of said disc, a spring blade, means on the fork engaging the blade to non-rotatably hold the blade, said blade bearing against one side of the disc, one end of the blade bearing against one side of the disc, the other end of the blade bearing against the toothed periphery of the disc.

3. A lawn edger comprising a handle, a fork mounted on the handle, a wheel rotatably mounted in the fork, a toothed disc mounted on the wheel for limited axial movement relative to the wheel, a non-metallic tire on the wheel, outwardly projecting buttons on the side of the tire, said buttons bearing against one side of said disc, a spring blade, means on the fork engaging the blade to non-rotatably hold the blade, said blade bearing against one side of the disc.

4. A lawn edger comprising a handle, a fork mounted on the handle, a wheel rotatably mounted in the fork, a toothed disc mounted on the wheel for limited axial movement relative to the wheel, a non-metallic tire on the wheel, outwardly projecting buttons on the side of the tire, said buttons bearing against one side of said disc, a spring blade, means on the fork engaging the blade to non-rotatably hold the blade, said blade bearing against one side of the disc, one end of the blade bearing against one side of the disc, the other end of the blade bearing against the toothed periphery of the disc.

5. A lawn edger comprising a handle, a fork mounted on the handle, a wheel rotatably mounted in the fork, a toothed disc mounted on the wheel for limited axial movement relative to the wheel, a non-metallic tire on the wheel, outwardly projecting buttons on the side of the tire, said buttons bearing against one side of said disc, a spring blade, means non-rotatably mounting said blade on said fork, said blade bearing against one side of the disc, said buttons yieldably pressing the disc against said blade, means non-rotatably mounting the blade on said fork, and said blade bearing against one side of the disc opposite the tire.

References Cited in the file of this patent
UNITED STATES PATENTS

| | | |
|---|---|---|
| 1,901,992 | Smith | Mar. 21, 1933 |
| 2,528,929 | Wessendorf | Nov. 7, 1950 |
| 2,660,854 | Chadwick | Dec. 1, 1953 |